J. TITTLE.
Straw Cutter.
No. 20,103.
Patented April 27, 1858.
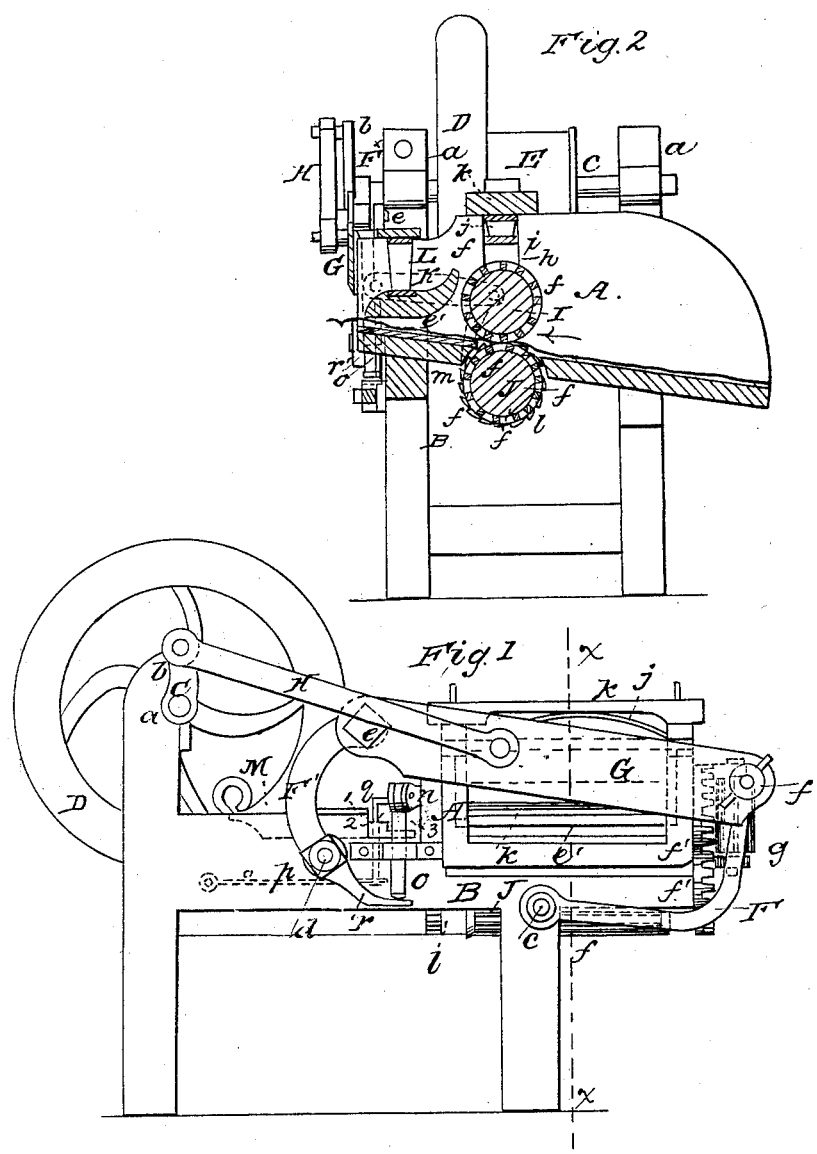

UNITED STATES PATENT OFFICE.

JOHN TITTLE, OF JOHNSTOWN, PENNSYLVANIA.

STRAW-CUTTER.

Specification of Letters Patent No. 20,103, dated April 27, 1858.

*To all whom it may concern:*

Be it known that I, JOHN TITTLE, of Johnstown, in the county of Cambria and State of Pennsylvania, have invented a new and Improved Machine for Cutting Straw, Stalks, Hay, and other Articles or Substances Used as Fodder for Stock; and I do hereby declare that the following is a full, clear, and exact description of the same, reference being had to the accompanying drawings, making a part of this specification, in which—

Figure 1 is a front view of my improvement. Fig. 2 is a transverse vertical section of the same; ($x$ $x$) in Fig. 1 showing the plane of section.

Similar letters of reference indicate corresponding parts in the two figures.

My invention consists in the peculiar means employed for operating the feed rollers and regulating their movement and the mode of hanging and operating the knife, also in the employment or use of a pressure bar for holding the straw or other substance firmly down upon the bed at the end of the feed box, so that the knife can act upon the straw or other substance to be cut in the most effective manner.

To enable others skilled in the art to fully understand and construct my invention, I will proceed to describe it.

A, represents the feed box, which is of the usual form and construction, and is placed transversely at one end of a rectangular framing B.

C, represents a driving shaft, which works in suitable bearings attached to uprights ($a$) ($a$) at the end of the framing, opposite to the end where the feed box is placed. A flywheel, D, is placed on the shaft C, and also a driving pulley E, and a crank ($b$) is placed on one end of said shaft.

To one side of the framing B, two levers or arms F, F', are attached side levers or arms working on bolts or pins, ($c$) ($d$), both of which are shown in Fig. 1. The outermost arm or lever, F, has its bolt or pin ($c$) some distance below the bolt or pin ($d$) on the arm or lever F', as plainly shown in Fig. 1. To the upper ends of the levers F, F', a knife G, is attached by screw bolts ($e$) ($f$).

H is a connecting rod, one end of which is attached to the knife, G, the opposite end being attached to the crank ($b$).

The bolt or pin ($c$) of the arm or lever F, is placed below the knife, some distance inward from its outer end, and consequently the two bolts or pins ($c$) ($d$) of the arms or levers are much nearer together than their upper ends, as plainly shown in Fig. 1.

The edge of the knife, G, bears against the edge of the feed box, A; the cutting edge of the knife passing entirely over the end of the bottom of the feed box, which bottom, at its edge, is faced with a metal plate ($e$).

Within the feed box A, a roller I, is placed transversely, and a roller, J, is placed underneath the feed box, the upper end of the roller J, working through an opening in the bottom of the feed box, as shown plainly in Fig. 2. Both of the rollers I, J, have plates or strips ($f$) attached longitudinally to their peripheries; the roller J, is placed directly underneath the roller I, and in the same plane. The rollers, I, J, have face wheels ($f'$) ($f'$), attached to them at one end, and these wheels gear into a trundle pinion ($g$) which has its axis fitted in bearings attached to the side of the feed box. The bearings of the roller I, are fitted in vertical slots ($h$) in the sides of the feed box, said bearings being connected by a transverse plate ($i$) against which a spring ($j$) bears, the upper end of said spring bearing against a cross board ($k$) on the feed box.

To one end of the lower roller J, the end opposite to that on which its face wheel is placed, a ratchet wheel ($b$) is placed, and ($m$) is a pawl which catches into the teeth of said ratchet. This pawl ($m$) is pivoted at its upper end to a lever ($n$) which is attached to one side of the feed box, and the outer end of this lever has a pendent bar ($o$) pivoted to it. A spring ($p$) which is attached to the upper part of the framing is connected to the lever ($n$) by a rod ($q$). This spring ($p$) has a tendency to keep the pawl ($m$) up free from the ratchet.

The lower end of the arm or lever F', or the part ($r$) below its bolt or pin ($d$) is of curved form, as clearly shown in Fig. 1.

K, is a curved bar or cross piece which is placed in the feed box A, near the knife, G. This bar has a spring L, bearing upon its upper surface as shown in Fig. 2.

M, is a sliding bar which is fitted in the upper part of the framing, A. This bar has its end formed with step-like projections 1, 2, 3, see Fig. 1, which may be shoved in and out underneath the lever, N.

The straw, stalks or other articles or substance to be cut is placed within the feed box, A, and motion being given the shaft C, in any proper manner, the straw or any other substance is drawn between the rollers I, J, and fed to the knife by said rollers. The knife G, is moved back and forth over the end of the feed box A, the knife moving forward with a downward and what is usually termed a drawing cut and cutting the straw or other substance, which is pressed firmly down upon the plate (e') by the bar K, acted upon by the spring L. This bar K, renders the straw or other substance compact at the edge of the plate (e') and thereby causes it to be cut by the knife with much greater facility than if it lay loose within the feed box. The straw or other substance is fed to the knife G, at the termination of its backward stroke, when it is at its highest point above the substance being cut, in consequence of the lower end or part (r) striking the lower end of the bar (o), and throwing up the outer end of the lever (n), the opposite end of course being depressed, and causing the pawl (m) to act upon the ratchet (b), thereby turning the lower roller J, which communicates an opposite movement to the upper roller I, by means of its face-wheel (f') rotating the trundle pinion (g) which rotates the face wheel of the upper roller.

The movement of the rollers, I, J, is graduated by controlling the movement of the lever (n). This is effected by turning either of the step-like projections 1, 2, 3, underneath the outer end of the lever (n) so as to give it a greater or less degree of vibration, and thereby increase or diminish the movement of the pawl.

The bearing of the upper roller I, being allowed to move up and down with the slots (h), it will be seen that the substance to be cut may be fed to the knife in greater or less quantities, as desired, the roller being also allowed to yield or give to the varying thickness of the layer passing between it and the lower roller, the bearings of which are immovable.

In consequence of having the arm or lever F, pivoted as shown, underneath and some distance inward from the outer end of the knife, an easy drawing cut is obtained and by merely removing the bolt (f) which secures the outer end of the knife to the lever or arm F, the knife may be placed in a vertical position, and sharpened as readily as a scythe.

Having thus described my invention, what I claim as new, and desire to secure by Letters Patent, is:

1. The arrangement substantially as shown of the knife G, with its arms or levers F, F', when connected for operation conjointly with the feed rollers I, J, pressure bar K, and feed bar A, in the manner and for the purpose herein set forth.

2. I also claim in combination with the lever n, pawl m, bar o, and curved portion r, the sliding bar M, arranged as shown for the purpose specified.

JOHN TITTLE.

Witnesses:
JOHN HOLLINGSHEAD,
J. F. WALLAND.